United States Patent [19]

Kao et al.

[11] Patent Number: 4,720,812
[45] Date of Patent: Jan. 19, 1988

[54] HIGH SPEED PROGRAM STORE WITH BOOTSTRAP

[75] Inventors: Ming-Luh Kao; Jong-Keung Cheng, both of Miami, Fla.

[73] Assignee: Racal-Milgo, Inc., Miami, Fla.

[21] Appl. No.: 615,362

[22] Filed: May 30, 1984

[51] Int. Cl.[4] .............................................. G06F 9/00
[52] U.S. Cl. ................................................... 364/900
[58] Field of Search ............................. 364/200, 900

[56] References Cited

U.S. PATENT DOCUMENTS

| | | | |
|---|---|---|---|
| 3,778,775 | 12/1973 | Haring et al. | 364/200 |
| 4,025,904 | 5/1977 | Adney et al. | 364/200 |
| 4,038,643 | 7/1977 | Kim | 364/200 |
| 4,051,461 | 9/1977 | Hashimoto et al. | 364/900 |
| 4,080,651 | 3/1978 | Cronshaw et al. | 364/200 |
| 4,080,652 | 3/1978 | Cronshaw et al. | 364/200 |
| 4,085,442 | 4/1978 | Liaukus et al. | 364/900 |
| 4,117,974 | 10/1978 | Ciaramella | 371/51 |
| 4,126,894 | 11/1978 | Cronshaw et al. | 364/200 |
| 4,165,534 | 8/1979 | Dummermuth et al. | 364/900 |
| 4,172,281 | 10/1979 | Gordon | 364/200 |
| 4,203,154 | 5/1980 | Lampson et al. | 364/200 |
| 4,204,206 | 5/1980 | Bakula et al. | 340/721 |
| 4,204,208 | 5/1980 | McCarthy | 340/745 |
| 4,295,192 | 10/1981 | Porcella | 364/200 |
| 4,313,158 | 1/1982 | Porter et al. | 364/200 |
| 4,403,283 | 9/1983 | Myntti et al. | 364/200 |
| 4,430,704 | 2/1984 | Page et al. | 364/200 |

FOREIGN PATENT DOCUMENTS 0077404 4/1983 European Pat. Off. .
0100140 2/1984 European Pat. Off. .
0105241 11/1984 European Pat. Off. .

OTHER PUBLICATIONS

*Basic Reference*, IBM Corporation, p. B-29 (Third Edition, May 1984).
"Architectural Considerations of a Signal Processor Under Microprogram Control", by Y. S. Wu, AFIPS Conference Proceedings, vol. 40, 1972 Spring Joint Computer Conference, May, 1972, pp. 675–683.

*Primary Examiner*—Gareth D. Shaw
*Assistant Examiner*—John G. Mills
*Attorney, Agent, or Firm*—Nixon & Vanderhye

[57] ABSTRACT

A microprocessor-based system is provided with a non-volatile store (such as a PROM) which stores a bootstrap program, a non-volatile store (such as an EPROM) which stores one or more program overlays, and a programmable volatile store (such as a RAM) which can be written into and read from. When the system is powered up, the microprocessor executes the bootstrap program out of the PROM. The bootstrap program includes instructions which copy the program instructions stored in the EPROM into the RAM. The microprocessor then executes the program instructions out of the RAM. Program instructions may be stored in the EPROM in a plurality of overlays, and individual overlays selected by either the bootstrap program or instructions contained in another overlay may be selectively loaded into the RAM for execution. The EPROM is addressed by a programmable counter which appears to the microprocessor as an input/output device to be written into.

14 Claims, 5 Drawing Figures

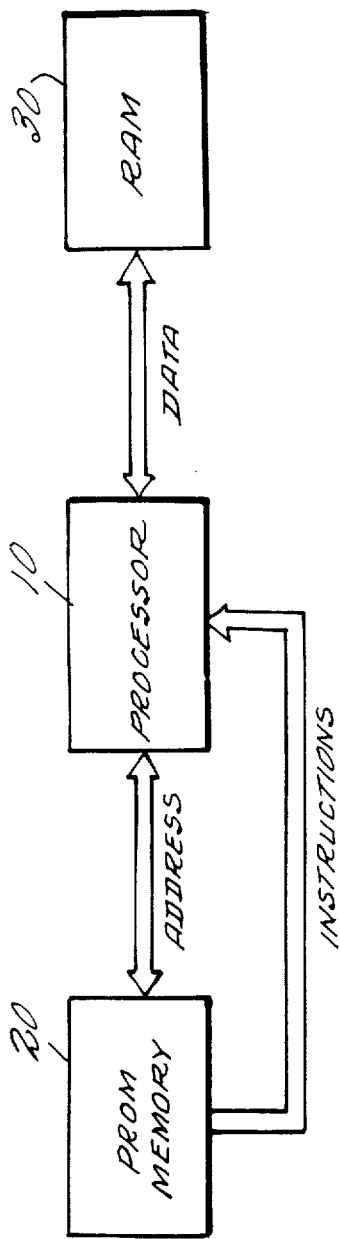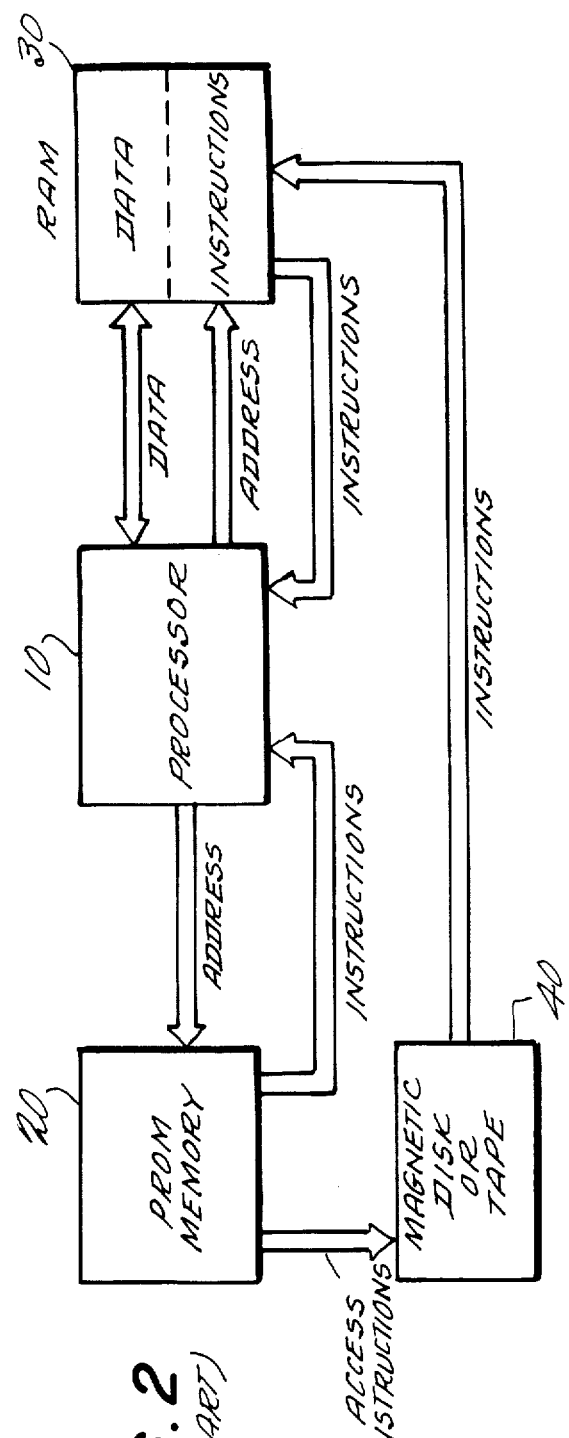
FIG. 1 (PRIOR ART)
FIG. 2 (PRIOR ART)

HIGH SPEED PROGRAM STORE WITH BOOTSTRAP

FIELD OF THE INVENTION

The invention is related to apparatus and method for the performance of a plurality of stored predetermined program tasks. More particularly, the invention is related to the storage of program instructions and data for execution by a general purpose digital computing device (such as a microprocessor) which requires initialization.

BACKGROUND OF THE INVENTION

Microprocessor-based systems presently are used in a wide variety of applications to provide computation and other signal processing functions under so-called "software" control. As is well known, memory structures are typically provided in such systems to store program instructions and data. It is usually necessary to provide both non-volatile memory (i.e., memory that will retain its contents even when the power supply to the system is turned off) as well as read/write random access memory (RAM) which may be used for storing temporary data and user-developed program instructions. Due to speed and flexibility considerations, semiconductor memory devices are typically now used to provide both non-volatile and read/write storage.

Of course, there are many different types of semiconductor memory devices presently commercially available. Perhaps the most commonly-used semiconductor memory device is the semiconductor read/write random access memory (RAM). RAMs are available in both bipolar and MOS technologies. In general, RAMs have the advantages of high density (i.e., high storage capability per unit volume), high speed and low cost. For these reasons, RAMs are typically the memory device of choice for microprocessor-based systems. RAMs can be obtained which have a memory access time which is shorter than the switching speeds of available microprocessors, so that the RAM does not limit the speed at which the microprocessor can execute program instructions.

RAMs, however, are volatile memory devices, and therefore lose their contents if their power supply is interrupted. Therefore, processing systems which may be turned on and off or which may have to be reset often are also typically provided with a non-volatile storage device for storing information which will be reused. Information which must be stored in a non-volatile storage device includes, for example, program instructions which must be executed each time the system is powered up. It is typically desirable to store all program instructions in nonvolatile memory (unless those program instructions must be capable of being altered by the user during the course of operation of the system).

One type of non-volatile storage which is often used is a semiconductor read only memory (ROM). In general, semiconductor ROMs are available in three types: mask-programmed ROMs, electrically programmable read only memories (PROM), and erasable programmable read only memories (EPROM). Information is stored in mask-programmed ROMs at the time of manufacture, and may not be changed by the user. Mask-programmed ROMs are relatively inexpensive if made in high volume, but are ordinarily not used for small-volume applications because of the expense of preparing and specifying a mask. In addition, maskprogrammed ROMs are ordinarily not used in a system unless the system software has been thoroughly tested, since their contents may not be changed.

PROMs, on the other hand, may be electrically programmed by a user. PROMs store no information when purchased. The user "programs" data into the PROM by applying electrical signals to it. Once the programming process is complete, the data which is stored in the PROM is permanent and cannot be altered. PROMs find wide use in low-volume applications (where mask-programmed ROMs would be uneconomical), as well as in applications where the stored information might be subject to change (for instance, where the system is still under development). PROMs are non-volatile, but if their contents are to be changed, may must be replaced.

Erasable programmable read only memories (EPROMs) are similar to PROMs except that they may be erased and reused. Typically, EPROMs are provided with a quartz lid which passes ultraviolet radiation. When the EPROM is exposed to ultraviolet radiation, its contents are erased. The EPROM may then be electrically programmed in a manner similar to that used to program a PROM. EPROMs are very useful for storing information that might be subject to change. However, EPROMs are expensive compared to RAMs, mask-programmable ROMs and PROMs. Moreover, EPROMs generally have greater access time than RAMs; in the past, the speed of a microprocessor executing instructions stored in an EPROM has been limited by the relatively slow access speed of the EPROM. As technology has advanced, faster EPROMs have been developed. However, EPROMs are still slow relative to RAMs, and are far more expensive.

One solution used in the past to provide nonvolatile storage for program instructions is to use the architecture shown in FIG. 1. A PROM memory device 20 stores micro-instructions to be executed by a processor 10. PROM memory 20 is non-volatile, and therefore retains the micro-instructions when the power to the system is shut off. A RAM 30 is used only to store temporary data developed by the processor 20 in the execution of the microinstructions. It does not matter too much if the temporary data stored by RAM 30 is lost, so the fact that the RAM is volatile is not detrimental. This architecture is well known in the art, and is disclosed in, for instance, U.S. Pat. No. 4,038,643 to Kim (issued July 26, 1977), U.S. Pat. No. 4,203,154 to Lampson et al (issued May 13, 1980) and U.S. Pat. No. 4,085,442 to Liaukus et al (issued Apr. 18, 1978). The architecture shown in FIG. 1 is quite suitable where PROM 20 need only store a small number of instructions (and therefore need only have a small number of locations). However, PROMs which have the capacity of storing a large number of instructions are relatively expensive. Moreover, if some portion of the stored program must be changed, PROM 20 must be discarded and a new PROM programmed and installed.

Of course, a more flexible way to provide program instructions to the processor for execution is to simply load them into RAM 30 each time the system is powered up. Data residing on a non-volatile mass storage device such as, for instance, a magnetic disk or tape might be loaded into RAM 30 each time the system power is turned on. The user need only change the information stored on the mass storage device in order to change the function of the processor. The loading of information from mass storage into a RAM must itself typically be performed by the processor under program control.

The architecture shown in FIG. 2 includes a PROM memory 20 for storing micro-instructions which includes instructions which direct processor 10 to transfer information from magnetic disk 40 to RAM 30. PROM 20 may contain a variety of initialization information (such as values for pointers pointing to locations in RAM 30) which may be used to initialize processor 10 at the time that power is applied to the system. Processor 10 may execute instructions contained in PROM 20, instructions loaded into RAM 30 from magnetic disk 40, or both. RAM 30 also may be used, of course, to store temporary data produced during execution of the instructions. This architecture is disclosed, for example, in U.S. Pat. No. 4,025,904 to Adney et al (issued May 24, 1977), U.S. Pat. No. 3,778,775 to Haring et al (issued Dec. 11, 1973), U.S. Pat. No. 4,165,534 to Dummermuth et al (issued Aug. 21, 1979), U.S. Pat. No. 4,204,206 to Bakula et al (issued May 20, 1980) and U.S. Pat. No. 4,204,208 to McCarthy (issued May 20, 1980).

Not all of the instructions stored on magnetic disk 40 need to be transferred into RAM 30 at once. U.S. Pat. No. 4,080,651 (issued Mar. 21, 1978), U.S. Pat. No. 4,080,652 (issued Mar. 21, 1978) and U.S. Pat. No. 4,126,894 (issued Nov. 21, 1978) all to Cronshaw et al disclose the transfer of information from mass storage 40 to RAM 30 in overlays without intervention from processor 10 but rather through use of a separate processor (not shown) dedicated to that purpose. RAM 30 may have a switching speed essentially the same as processor 10, and therefore not limit the speed of execution of program instructions by the processor. However, since the cost of a RAM increases with the amount of information which it must store, a small RAM is used and overlays of information from magnetic disk 40 are selectively loaded when needed into RAM 30 for execution by processor 10. Once the loaded instructions have been executed, they may be written over by new instructions yet to be executed which reside on magnetic disk 40. RAM 30 is typically called a "cache" or "accelerator" storage because it is both relatively small and has a low access time. The use of a cache store is also disclosed in U.S. Pat. No. 4,313,158 to Porter et al (issued Jan. 26, 1982) and U.S. Pat. No. 4,051,461 to Hashimoto et al (issued Sept. 27, 1977).

U.S. Pat. No. 4,403,283 to Myntti et al (issued Sept. 6, 1983) and U.S. Pat. No. 4,295,192 to Porcella (issued Oct. 13, 1981) both disclose memory mapping techniques for expanding the addressing space which a processor is capable of addressing. Although microprocessors typically are capable of addressing only a limited number of storage locations (the number of storage locations being limited by the number of bits in the address produced by the microprocessor), it is often necessary to address a larger address space than the microprocessor is designed for. Memory "mapping" or translating arrays (which may be either sequential machines or combinational logic arrays) supply higher-order address bits, thus increasing the address space accessible by the processor.

SUMMARY OF THE INVENTION

The present invention provides low cost, flexible storage for storing program instructions, high access speed storage for storing instructions to be executed by a microprocessor, and a separate store for storing an initialization routine. In accordance with the presently preferred exemplary embodiment of this invention, a data bus conveys signals associated with program instructions. A first non-volatile memory (which may comprise an EPROM) stores a first plurality of program instructions and applies the first plurality of instructions to the data bus in response to a first read signal produced by the microprocessor. The first plurality of program instructions defines at least one function to be performed by the system. A second non-volatile memory (which may be a semiconductor PROM) stores a second plurality of program instructions (a "bootstrapping" routine) which is used for initialization of the system. The second memory applies the bootstrap routine to the data bus in response to a first addressing signal produced by the microprocessor. The first addressing signal may be produced upon power-up as well as at any time that the system is to be reset. In response to the appearance on the data bus of signals associated with the second plurality of program instructions stored by the PROM, the microprocessor produces the first read signal to cause the first memory to apply signals to the data bus which are associated with the first plurality of program instructions. The microprocessor loads the first plurality of program instructions from the data bus into a programmable memory (which may be a semiconductor RAM) under the direction of the second plurality of program instructions. Once the first plurality of program instructions have been loaded into the programmable main memory, the microprocessor executes the first plurality of program instructions out of the main memory.

The first plurality of program instructions may be organized into plural overlays ("subsets of program instructions"), if desired. The second plurality of program instructions stored in the PROM may direct that a particular one of the overlays stored in the EPROM be loaded into the RAM. The overlay loaded into the RAM may then direct that another particular overlay stored in the EPROM be loaded into the RAM (either concurrently or at the conclusion of execution of the first overlay). An address map may be used to prevent the microprocessor from addressing the PROM and the RAM simultaneously.

The first memory in accordance with the present invention may comprise a large EPROM with relatively slow access time and a larger addressing space than is capable of being addressed directly by the microprocessor. The microprocessor may load a programmable counter with the starting location in the EPROM of an overlay to be transferred from the EPROM into the RAM. The counter may then sequentially address the EPROM to effect the transfer of information from the EPROM onto the data bus. A latch may be provided at the output of the EPROM to temporarily store the data produced by the EPROM until the RAM stores the information.

In accordance with the presently preferred embodiment of the invention, an EPROM with relatively high access time may be used to store a library of routines of program instructions to be executed by the microprocessor. The PROM may be extremely small since it is used only to provide the microprocessor with instructions necessary to transfer a first overlay from the EPROM to the RAM. The RAM can also be small, thus decreasing the cost of the system while permitting the processor to access instructions at high speeds.

BRIEF DESCRIPTION OF THE DRAWINGS

These and other features and advantages of the present invention can be more easily understood from the following more detailed description taken in conjunction with the accompanying drawings, in which:

FIG. 1 is a block schematic diagram of a prior art microprocessor signal processing system;

FIG. 2 is a schematic block diagram of another prior art microprocessor-based signal processing system;

DETAILED DESCRIPTION OF THE PRESENTLY PREFERRED EMBODIMENT

Figure 3:
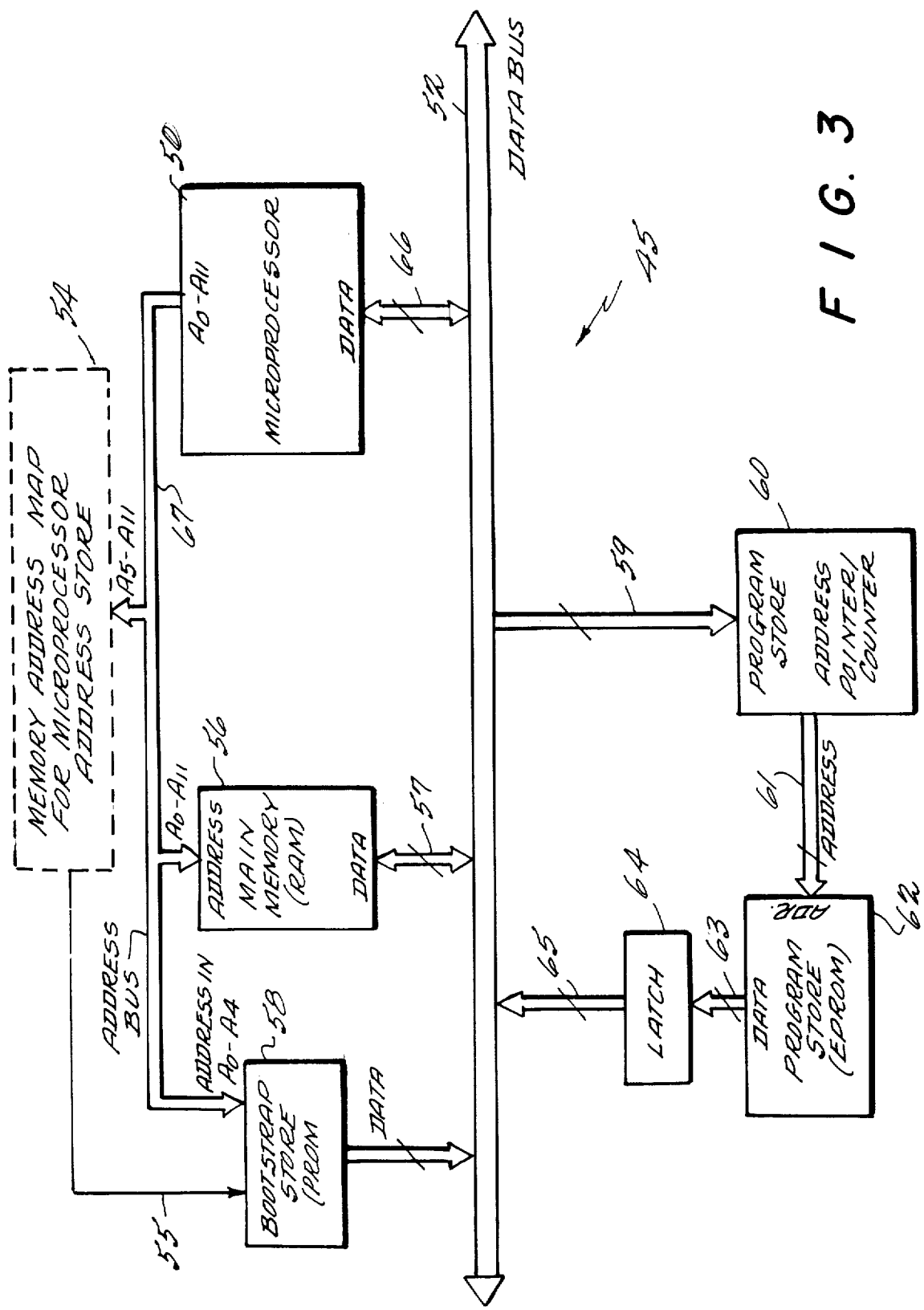
FIG. 3 is a schematic block diagram of the presently preferred exemplary embodiment in accordance with the present invention.

A schematic block diagram of the presently preferred exemplary embodiment of a system 45 in accordance with the present invention is shown in FIG. 3. The embodiment shown includes a microprocessor 50, a data bus 52, a memory address map 54, a main memory 56, a bootstrap store 58, a program store address pointer/counter 60, a program store 62 and a latch 64.

Microprocessor 50 may comprise any commercially available microprocessor (such as the TI320 available from Texas Instruments, Inc., Dallas, Tex.). Microprocessor 50 has a fixed number of address lines and is therefore capable of addressing a fixed address space. In the preferred embodiment, microprocessor 50 has twelve address lines $A_0$–$A_{11}$, enabling it to address $2^{12}$ storage locations.

Microprocessor 50 is connected to data bus 52 (a tri-state bus in the preferred embodiment) by a data link 66 (which may include a plurality of individual tri-state data lines). As is well known, microprocessor 50 includes a plurality of internal registers (such as a memory address register, a status register, a program counter, an instruction register and general purpose registers), an arithmetic logic unit (for performing operations on data) and control logic (for producing a plurality of different control signals in response to the instructions being executed). Data appearing at the DATA input of microprocessor 50 may be stored in an internal register, and operations on the stored data may be performed by the arithmetic logic unit.

Microprocessor 50 produces addresses on its address lines ($A_{0-11}$), which are applied to the ADDRESS input of main memory 56 via address bus 67. Microprocessor 50 thereby addresses respective ones of a plurality of storage locations of main memory 56. In response to address signals and control signals (to be discussed shortly) applied to the main memory 56, the main memory produces signals corresponding to the contents of the addressed storage locations on its DATA output, which can be transferred (via data link 57 and data bus 52) into a register internal to microprocessor 50.

In the preferred embodiment, many of the storage locations of main memory 56 contain program instructions to be executed by microprocessor 50. In the preferred embodiment, main memory 56 comprises a conventional read/write semiconductor random access memory (RAM) having 4K storage locations each storing one word of information. The access time of main memory 56 is faster than the cycle time of microprocessor 50 (i.e. the time which microprocessor requires to execute an instruction, about 90 ns in the preferred embodiment) so that it does not slow down the execution of instructions by microprocessor 50.

The contents of the internal register of microprocessor 50 which has been loaded with a program instruction from main memory 56 is decoded to enable the microprocessor to perform the tasks specified by the instruction. As is well known, the instruction may specify one or more of a large number of tasks (such as, for instance, outputting data onto data bus 52 via data link 66, manipulating data stored in the registers internal to the microprocessor for application to a specified device connected to the bus, changing the contents of the internal program counter to effect a conditional or unconditional branching, storing in an internal register the data present on data bus 52, changing the contents of one of the storage locations of main memory 56, etc.).

As is well known, microprocessor 50 may produce a variety of control signals other than the address and data signals shown in FIG. 3. For instance, in the preferred embodiment, microprocessor 50 produces signals to control the operation of data bus 52, signals to be applied to main memory 56 to permit reading or writing of the location in the main memory corresponding to the address output applied to address bus 67 (as will be explained shortly), I/O (input/output) control signals to control various I/O peripheral devices, etc. The various control signals are automatically produced at appropriate times in response to executed instructions (for instance, if an instruction being executed calls for reading the contents of a location of main memory 56, microprocessor 50 automatically produces a control signal to place the main memory in the read mode, produces another control signal to control data bus 52 to permit transfer of information from the main memory DATA port to the microprocessor DATA input, and places an appropriate address onto address bus 67). These control signals and pathways are conventional and well known, and are therefore not shown in FIG. 3.

As mentioned above, microprocessor 50 has twelve address lines ($A_{0-11}$). In the preferred embodiment, $A_0$ is the least significant bit (LSB) of the address produced by microprocessor 50, while $A_{11}$ is the most significant bit (MSB) of the address. All of the address bits produced by microprocessor 50 are applied to the ADDRESS input of main memory 56 via address bus 67. The five least significant address bits ($A_0$–$A_4$) produced by microprocessor 50 are applied to the ADDRESS input of bootstrap store 58. In addition, the seven most significant address bits ($A_{5-11}$) produced by microprocessor 50 are applied to the input of memory address map 54. The function of memory address map 54 is to permit microprocessor 50 to address main memory 56 and bootstrap store 58 alternatively (i.e. never simultaneously) while ensuring that this alternative addressing scheme is completely transparent to the microprocessor. In other words, memory address map 54 permits microprocessor 50 to address main memory 56 and bootstrap store 58 as a single integrated memory address space rather than as two physically-distinct memory devices. Bootstrap store 58 in the preferred embodiment comprises an electrically programmable read only memory (PROM) having 32 storage locations of one word each. Bootstrap store 58 has an access time approximately the same as that of main memory 56. The contents of the storage locations of bootstrap store 58 will be discussed in greater detail shortly.

Figure 4:
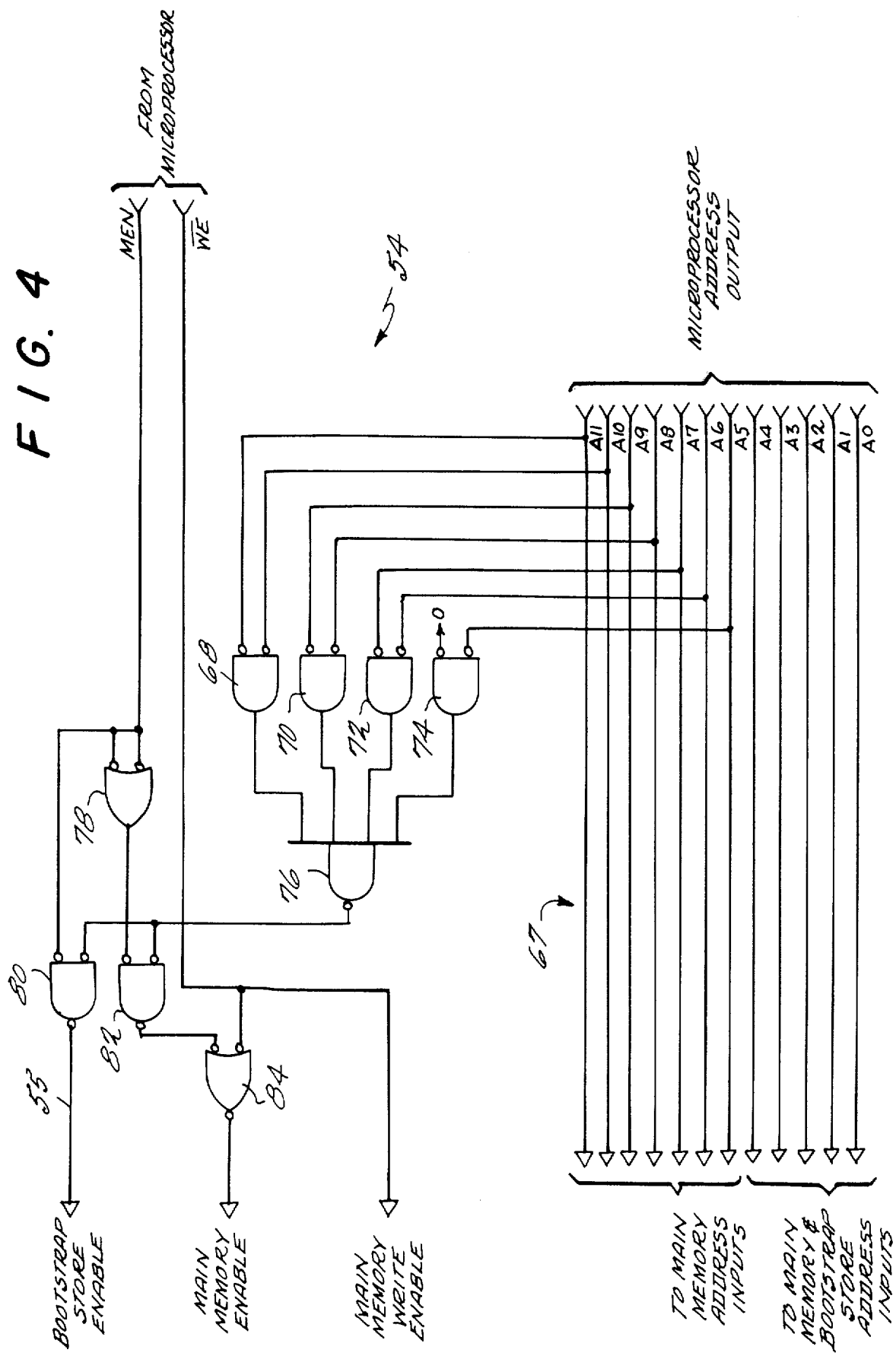
FIG. 4 is a detailed schematic diagram of the memory address map block shown in FIG. 3.

FIG. 4 shows a detailed schematic diagram of the memory address map 54. In the preferred embodiment, memory address map 54 comprises a simple combinational logic array which derives memory control signals for bootstrap store 58 and main memory 56 from the memory control signals produced by microprocessor 50 together with the seven most significant bits ($A_{5-11}$) of the microprocessor address output. The conventional control signal $\overline{WE}$ produced by microprocessor 50 is referred to as the "out write enable" signal, and when active (i.e., at logic level LOW), indicates that the microprocessor is attempting to output data on its DATA output to be written into the location of memory specified by the microprocessor address output. Conventional $A_{11}$ control signal $\overline{MEN}$ produced by microprocessor 50 is the "out memory enable" signal, and when active (i.e., at logic level LOW), indicates that the microprocessor address output contains a valid memory address. The signal $\overline{WE}$ is routed directly to a corresponding control input of main memory 56 but not to bootstrap store 58 (since the bootstrap store is only read from and never written to). Memory address map 54 produces two mutually exclusive output signals, "bootstrap store enable" and "main memory enable", which cause either the bootstrap store 58 or main memory 56 (respectively) to place data onto data bus 52.

Logic gates 68-76 decode the seven most a significant bits $A_{5-11}$ produced by microprocessor 50. The "bootstrap store enable" signal is produced only during the time when both microprocessor 50 issues control signals indicating that a valid address is on its address output and the issued address is one of the lowest 32 locations in the microprocessor address space. If microprocessor 50 produces a valid address which is higher than one of the lowest 32 location in its addressing space, memory address map 54 produces the "main memory enable" signal. It will be understood that the memory address map 54, main memory 56 and bootstrap store 58 simulate a unitary 4 K word memory in which the lowest 32 words are non-volatile (and read-only) while the remainder of the words are volatile and can be written into as well as read from.

The switching between main memory 56 and bootstrap store 58 is totally transparent to the program instructions executed by microprocessor 50, and thus need not worry a human programmer.

Looking back to FIG. 3, when the "main memory enable" signal is produced by memory address map 54, main memory 56 applies signals to data bus 52 representing the contents of the location of the main memory corresponding to the address present on address bus 67. When the "main memory write enable" signal is produced by memory address map 54, main memory 56 stores the data present on data bus 52 into the location in the main memory corresponding to the address present on address bus 67. Similarly, when the "bootstrap store enable" signal is produced by memory address map 54 (and applied to the bootstrap store via control line 55), bootstrap store 58 applies to data bus 52 signals associated with the contents of the location in the bootstrap store associated with the signals applied to its ADDRESS input (the five least significant bits $A_0-A_4$ of the address produced by microprocessor 50).

Program store address pointer/counter 60 is connected via data link 59 to data bus 52. Counter 60 in the preferred embodiment comprises a conventional programmable counter. In response to a "load" control signal produced by microprocessor 50 (in conjunction with external conventional logic not shown), counter 60 loads the data present on data bus 52. Hence, counter 60 appears to microprocessor 50 as an I/O peripheral device capable of being written to. In response to a clock signal and a COUNTER ENABLE control signal (not shown) produced by microprocessor 50, counter 60 increments the value which it has stored by one count in response to every clock pulse produced by a conventional system clock (not shown).

The output of counter 60 is applied to the address input of program store 62 via an address bus 61. Program store 62 in the preferred embodiment comprises an erasable programmable read only memory (EPROM) having 32K locations each storing one word of information. The DATA output of program store 62 is applied to the input of a conventional latch 64 via a data line 63. The output of latch 64 is connected to data bus 52 by a data line 65. As will be readily surmised, the number of signals which must be latched by latch 64 and the counting capacity of counter 60 are directly related to the size of program store 62.

The function of counter 60 is to sequentially address program store 62 beginning at a location loaded into the counter by microprocessor 50 via data bus 52. Although microprocessor 50 in the preferred embodiment produces only twelve bits of address, it produces a full sixteen bits of parallel data at its DATA output; therefore, the DATA output of the microprocessor can specify an arbitrary address of program store 62. Once this arbitrary address is loaded into counter 60, the counter increments automatically (at every other cycle of microprocessor 50 in the preferred embodiment) thereby addressing program store 62 sequentially beginning at the loaded address. The counter is only incremented at every other cycle of microprocessor 50 because the access time of program store 62 in the preferred embodiment is greater than one cycle time of the microprocessor but less than two cycle times. Latch 65 may be omitted if program store 62 is sufficiently fast with respect to the cycle time of microprocessor 50.

In response to an address applied by counter 60 to its ADDRESS input, program store 62 produces at its DATA output the data stored in the location corresponding to the address. An appropriate period of time after an address is applied to program store 62, latch 64 latches the data produced by program store 62, thereby making it available to be applied to data bus 52.

In the preferred embodiment, program store 62 contains a plurality of program instructions and data organized into "overlays" or blocks. Each overlay contains program instructions defining a particular task or function to be performed by microprocessor 50. The overlays stored in program store 62 may be arbitrarily organized according to user applications. For instance, if system 45 is operated as a sequential finite state sequential machine, one or more overlays might correspond to the task or tasks to be performed for each state which the machine may enter.

One constraint which is imposed upon the overlays in the preferred embodiment is that they must somehow be cross-linked, i.e., each overlay except the last overlay to be executed must include instructions which control the loading and transfer of control to another overlay to be executed. Cross-linking of overlays will be explained in greater detail shortly. Although each overlay typically performs a single task or function (which may include many subtasks to be performed by the microprocessor), overlays may be of arbitrary size (depending upon the complexity of the function which it performs). Some functions to be performed may contain so many instructions that more than one overlay is required to perform the function.

Figure 5:
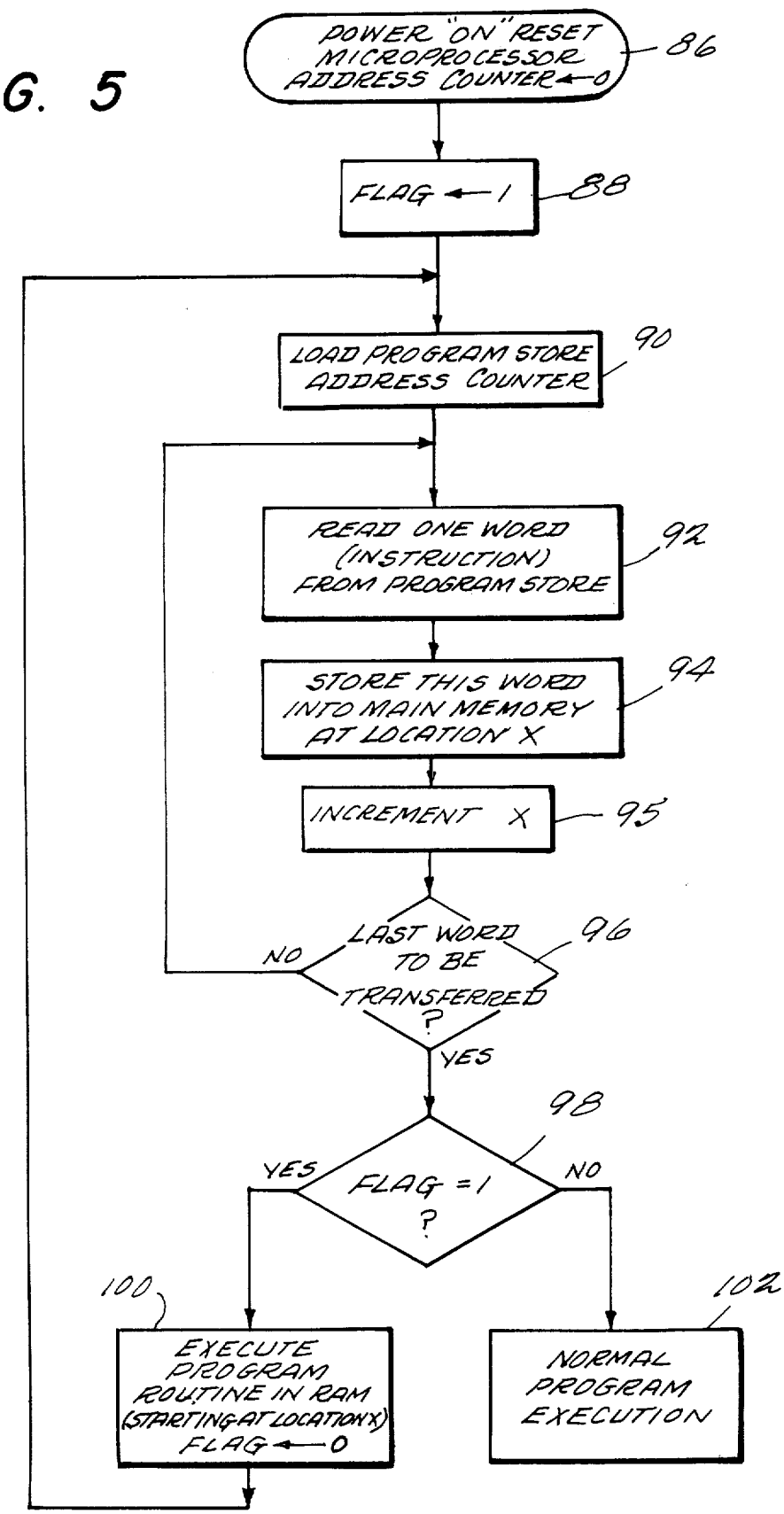
FIG. 5 is a flow chart of the program instructions stored in the bootstrap store block shown in FIG. 3.

FIG. 5 shows a flow chart of the instructions contained by bootstrap store 58 in accordance with the present invention. The flow chart is entered at block 86 when power is applied to system 45, which automatically causes microprocessor 50 to address the lowest location in its address space (i.e., by setting the microprocessor program counter to the value $000_{16}$). This address resetting function is conventionally performed by hardware in the preferred embodiment. The produced address is decoded by memory address map 54 to be the first location in bootstrap store 58, as previously discussed. Block 88 sets a flag (the purpose of which will become apparent shortly). Block 90 loads program store address pointer/counter 60 with the starting location in program store 62 of the first overlay to be executed by microprocessor 50.

A loop (comprising blocks 92, 94, 96) copies the first overlay to be executed from bootstrap store 58 into main memory 56. Block 92 reads a single word from program store 62 and stores it into an internal register (the Instruction Register) in microprocessor 50. Block 94 then transfers the stored word just read from the internal register in microprocessor 50 into main memory 56 beginning at a specified location x. Block 95 increments x (which, in the preferred embodiment, is stored in a general purpose register in the microprocessor) to the next sequential location in main memory 56. Block 96 tests to determine if the word just loaded into main memory 56 was the last word to be transferred. Block 96, of course, can be implemented in a number of ways (such as by testing the value of x, using a separate loop counter register which is simultaneously incremented when x is incremented, requiring that the last word to be transferred have some unique value which can be tested for by microprocessor 50, etc.). If the word just transferred into main memory 56 was not the last word to be transferred, control returns to block 92 to read another word.

If the last word in the overlay has been transferred, then the flag is tested by block 98. If the flag is still set, block 100 begins executing the overlay just loaded into main memory 56 beginning at location x (block 100). The flag is also reset to 0 by block 100. In the preferred embodiment, the first overlay to be loaded into main memory 56 is a diagnostic testing program which is executed every time system 45 is powered up. In the preferred embodiment, at the conclusion of the execution of the diagnostic testing routine, the bootstrap routine stored in bootstrap store 58 is used again to load the next overlay to be executed from program store 62 to main memory 56. Blocks 90-96 perform the same function as before except that block 90 loads program store address pointer/counter with the starting location in program store 62 of the next overlay to be executed.

After block 90 has been executed for the second time and the loop comprising blocks 92-96 has been traversed a second time,block 98 once again tests to determine if the flag is set. Because the flag was reset in block 100, the flag will not be set at this time, and block 102 is entered. Block 102 simply loads the internal program counter of microprocessor 50 with x (the location in main memory 56 in which the last overlay loaded into main memory 56 begins) or with some other address of the main memory at which the first instruction to be executed exists. In the preferred embodiment, bootstrap store 58 is not addressed again untl system 45 is either reset or powered off and thenon again. It will be recognized that both blocks 100 and 102 in the flow chart of FIG. 5 are performod by executing instructions stored in main momory 56, while blocks 88-98 are performed by executng instructions stored in bootstrap store 58.

In the preferred embodiment, many overlays (including the diagnostic tesoing routine overlay) are stored in program store 62. As previously mentioned, since bootstrap store 58 only provides for the copying of a first and a second overlay into main memory 56, the remainder of the overlays must themselves include cross-linking routines for cooying of additional overlays into the main memory. For instance, the second overlay to be loaded into main memory 56 may include instructions to load a third overlay into main memory 56. This third overlao might be loaded at the conclusion of execution of tho second overlay (thus replacing the second overlay) at the beginning of the execution of the second overlay (so that the second and a third overlays would both reside in main memory 56 simultaneously), etc. Of course, branching may be accomplished by loading one overlay if a condition is satisfied and loading a different overlay if the condition is unsatisfied. Great flexibility in programming is provided through the use of overlays. Although each overlay must include some instructions to cause the next overlay to be executed to be loaded into main memory 56 and instructions to transfer control to that next overlay, such cross-linking routines have few instructions and do not occupy much memory space.

Although only one exemplary embodiment has been described in detail above, those skilled in the art will appreciate that many variations and modifications may be made in this embodiment without departing from the novel and advantageous features of this invention. For instance instructions could be loaded directly from program store 62 to main memory 56 using direct memory access techniques. Likewise, the cross-linking of overlays could be accomplished in a variety of different ways (such as by a look-up table stored in program store 62 or elsewhere). Memory address map 54 could bo implemented in a variety of different ways, and need not comprise combinational logic. Microprocessor 50 could be replaced by any processing deoice which is capable of performing tasks under program control. Accordingly, all such variations and modifications are intended to be included within the scope of the following claims.

What is claimed is:

1. A digital signal processing system which automatically loads program instructions from a non-volatile memory means into a main memory means upon initialization, said system comprising:
   data bus means for communicating signals associated with program instructions;
   address bus means for communicating address signals;
   first non-volatile memory means connected to said data bus means and to said address bus means for retaining a first plurality of program instructions and for applying first signals associated with said first plurality of program instructions to said data bus means in response to the presence of first address signals on said address bus means;
   second non-volatile memory means connected to said data bus means for retaining a second plurality of program instructions and for applying second signals associated with said second plurality of program instructions to said data bus means in response to a first control signal;

programmable main memory means, connected to said data bus means and to said address bus means and also connected to receive read and write control signals, for storing program instructions associated with signals appearing on said data bus means in response to the presence of second address signals on said address bus means and in response to generation of a write control signal, and for applying the signals associated with said program instructions stored therein to said data bus means in response to presence of second address signals on said address bus means and in response to generation of a read control signal; and processing means, connected to said data bus means, said address bus means, said main memory and said first memory means, said processing means capable of directly addressing storage locations within said main memory means and said first memory means via said address bus means, for performing the followingn functions upon initialization;

(1) applying first address signals to said address bus means;

(2) generating said first control signal in response to the presence on said data bus means of said first signals applied thereto by said first memory means, thereby controlling said second memory means to apply said second signals to said data bus means;

(3) applying second address signals to said address bus means and generating said write control signal so as to control said main memory means to store program instructions associated with said second signals;

(4) applying second address signals to said address bus means and generating said read control signal so as to control said main memory means to apply to said data bus means the signals associated with said program instructions stored therein; and (5) performing tasks specified by said stored program instructions in response to said sigtnals applied to said data bus means by said main memory means.

2. An apparatus as in claim 1 wherein said first and second non-volatile memory means each comprise a semiconductor programmable read only memory and said programmable main memory means comprises a semicondutor random access memory.

3. An apparatus as in claim 2 wherein said second memory means is capable of being erased and reprogrammed.

4. An apparatus as in claim 1 wherein:

said second memory means stores said signals associated with said second plurality of program instructions in respective storage locations; and said second memory means includes counting means, responsive to said first control signal, for generating address signals and for indexing the second memroy means respective locations with said last-mentioned address signals.

5. An apparatus as in claim 4 wherein:

said counting means includes programmable counter means, connected to said data bus means and to said processing means, for addressing a plurality of respective storage locations of said second memory means beginning at a predetermined storage location, said programmable counter means also for indexing said predetermined storage location in response to load signal generated by said processing means and a signal appearing on said data bus means representing said predetermined storage location; and said processing means also performs the functions of
(a) applying said signal representing said predetermined storage location to said data bus means, and
(b) generating said load signal.

6. An apparatus as in claim 4 further including latch means, connected between said second memory means and said data bus means, for temporarily storing signals associated with said second plurality of program instructions until said signals have been copied to said main memory means.

7. An apparatus as in claim 1 wherein said processing means includes address decoding means for alternately producing said first and said second address signals.

8. A system as in claim 1 wherein:

said second plurality of program instructions are stored in said second memory means in at least first and second overlays, said first and second overlays each defining a predetermined function; and said processing means selects said first overlay in response to said signals applied to said data bus means associated with said first plurality of program instructions, and selects said second overlay in response to at least one of said program instructions included in said first overlay.

9. In a digital signal processing system of the type including a processor connected to a main memory via an address bus and a data bus, said address bus communicating address signals produced by said processor, said address signals selecting storage locations within said memory, said data bus communicating signals stored in selected storage locations to said processor, said communicated data signals representing program instructions which said processor executes to perform tasks, an improved method of initializing said digital signal processing system including the steps of:

(1) maintaining a first set of instructions in a first non-volatile program store;

(2) maintaining a second set of instructions in a second non-volatile program store, said second instruction set including instructions controlling the copying of said first instruction set into a main memory;

(3) directly addressing said second store with a processor and executing said second instruction set out of said second store with said processor in response to a reset signal received by said processor;

(4) copying, with said processor, said first set of instructionns from said first store to said main memory under control of said second instruction set; and (5) executing with said processor the instructions stored in said main memory.

10. A method as in claim 9 wherein:

said maintaining step (1) includes the step of maintaining at least first and second instruction set overlays each including a set of instructions;

said copying step (4) includes copying said first overlay from said first store to said main memory;

said first overlay includes instructions controlling copying of said second overlay from said first store to said main memory; and said method further includes the step of copying said second overlay from said first store to said main memory with said processor with the control of said first overlay instructions.

11. A method as in claim 9 wherein:

said first set of instructions are organized in a plurality of overlays specifying different predetermined tasks;

said copying step (4) includes copying a first of said plurality of overlays from said first store to said main memory; and said predetermined tasks specified by said first overlay includes a linking task controlling copying of a further overlay to said main memory.

12. A method as in claim 9 wherein said addressing step (3) and said executing step (5) each include the step of conveying signals along a data bus, said data bus communicating with said first and second program stores, said processor, and said main memory.

13. In a digital signal processing system of the type including a processor connected to a main memory via an address bus and a data bus, said address bus communicating address signals produced by said processor, said address signals selecting storage locations within said main memory, said data bus communicating signals stored in selected storage locations to said processor, said communicate data signals representing program instructions which said processor executes to perform tasks, an improved method of initializing said digital signal processing system including the steps of:

(1) reading signals associated with a first plurality of program instructions directly from a first non-volatile memory with said digital signal processor in response to the initial application of a power supply voltage to said processor;

(2) executing said first plurality of instructions with said digital signal processor in response to said signals read by said reading step, said executing step including controlling a second non-volatile memory to apply signals associated with selected overlays of a second plurality of program instructions stored in said second non-volatile memory to said data bus, said overlays being selected by said first plurality of program instructions;

(3) storing said applied signals associated with said second plurality of program instructions into said main memory;

(4) addressing said main memory with said digital signal processor to cause signals associated with said stored second plurality of program instructions to appear on said data bus;

(5) executing said second plurality of program instructions with said digital signal processor in response to the appearance on said data bus of the signals associated with said second plurality of program instructions.

(6) repeating said executing step (2), storing step (3), addressing step (4) and executing step (5) for a plurality of overlays.

14. In a digital signal processing system of the type including a microprocessor connected to a volatile random access memory read/write store via an address bus and a data bus, said address bus communicating address signals produced by said microprocessor, said address signals selecting storage locations within said read/write store, said data bus communicating signals stored in selected storage locations to said microprocessor, said communicated data signals representing program instructions which said microprocessor executes to perform tasks, an improved method of initializing said system comprising the steps of:

(1) in response to an externally generated reset signal, generating first address signals with said microprocessor and applying said first address signals to said at address bus;

(2) inhibiting said read/write store from responding to said first address signals;

(3) selected storage locations within a non-volatile bootstrap store high-speed read only memory also connected to said address bus and to said data bus with said generated first address signals, said bootstrap store read only memory retaining signals representing initialization program instructions;

(4) applying the initialization program instruction signals stored in said selected bootstrap read only memory storage locations to said data bus;

(5) executing said initialization program instructions with said microprocessor in response to said signals applied to said data bus by said applying step (4), including the step of controlling a further non-volatile program store to apply further signals representing program instructions to said data bus;

(6) applying second address signals to said address bus and controlling said read/write store to store said further signals therein in storage locations selected by said second address signals;

(7) applying third address signals to said address bus and controlling said read/write store to apply said stored said further signals to said data bus; and (8) performing tasks represented by said further signals applied to said data bus by said applying step (7) with said microprocessor.

* * * * *